(12) United States Patent
Waikar et al.

(10) Patent No.: US 7,570,011 B2
(45) Date of Patent: Aug. 4, 2009

(54) BATTERY CHARGER

(75) Inventors: Shailesh P. Waikar, Cockeysville, MD (US); Bhanuprasad V. Gorti, Abingdon, MD (US)

(73) Assignee: Black & Decker Inc., Newark, DE (US)

( * ) Notice: Subject to any disclaimer, the term of this patent is extended or adjusted under 35 U.S.C. 154(b) by 120 days.

(21) Appl. No.: 11/399,948

(22) Filed: Apr. 7, 2006

(65) Prior Publication Data

US 2006/0250112 A1 Nov. 9, 2006

Related U.S. Application Data

(60) Provisional application No. 60/676,041, filed on Apr. 29, 2005.

(51) Int. Cl.
*H02J 7/14* (2006.01)
(52) U.S. Cl. .................. 320/104; 320/103; 320/107; 320/123
(58) Field of Classification Search ............... 320/103, 320/104, 107, 112, 114, 117, 123, 138; 307/10.1, 307/18.71, 18, 71; 429/97, 100
See application file for complete search history.

(56) References Cited

U.S. PATENT DOCUMENTS

| | | | |
|---|---|---|---|
| 4,779,184 A | 10/1988 | White | |
| 4,888,544 A | 12/1989 | Terry et al. | |
| 5,332,957 A | 7/1994 | Lee | |
| 5,362,942 A * | 11/1994 | Vanderslice et al. | 219/209 |
| 5,387,858 A * | 2/1995 | Bender et al. | 320/101 |
| 5,477,126 A | 12/1995 | Shiojima | |
| 5,646,486 A | 7/1997 | Edwards et al. | |
| 5,721,481 A * | 2/1998 | Narita et al. | 320/111 |
| 5,783,930 A | 7/1998 | Albert et al. | |
| 5,826,958 A * | 10/1998 | Avitan | 320/136 |
| 5,886,503 A * | 3/1999 | McAndrews et al. | 320/121 |
| 6,297,616 B1 * | 10/2001 | Kubo et al. | 320/116 |
| 6,329,796 B1 * | 12/2001 | Popescu | 320/134 |
| 2002/0070707 A1 * | 6/2002 | Sato | 320/134 |
| 2002/0089314 A1 | 7/2002 | Susak | |
| 2005/0083016 A1 * | 4/2005 | Yau et al. | 320/116 |

FOREIGN PATENT DOCUMENTS

| | | |
|---|---|---|
| EP | 0837548 A2 | 4/1998 |
| WO | WO 00/54397 A | 9/2000 |
| WO | WO 2005/006526 A1 | 1/2005 |

OTHER PUBLICATIONS

S. Lorenzo Feijoo, European Search Report, Jan. 17, 2007, Munich, Germany.
Annex to the European Search Report on European Patent Application No. EP 06112997.

* cited by examiner

*Primary Examiner*—Akm E Ullah
*Assistant Examiner*—M'Baye Diao
(74) *Attorney, Agent, or Firm*—Michael Aronoff; Adan Ayala

(57) ABSTRACT

A charger including a power supply connectable to an outside power source, first and second battery power sources connected to the power supply for providing power to a battery pack, and a controller connected to the first and second battery power sources for controlling the first and second battery power sources. The first and second battery power sources are preferably connected in parallel to the battery.

7 Claims, 4 Drawing Sheets

BATTERY CHARGER

CROSS-REFERENCE TO RELATED APPLICATIONS

This application derives priority from U.S. Application No. 60/676,041, filed Apr. 29, 2005.

BACKGROUND OF THE INVENTION

This invention relates generally to battery chargers and more particularly to battery chargers with multiple current sources.

The battery packs for portable power tools, outdoor tools and certain kitchen and domestic appliances may include rechargeable batteries, such as lithium, nickel cadmium, nickel metal hydride and lead-acid batteries, so that they can be recharged rather than be replaced. Thereby a substantial cost saving is achieved.

It is preferable to provide a battery charger that will quickly charge the battery packs while minimizing any damage to the battery pack caused by the charging process.

SUMMARY OF THE INVENTION

An improved battery pack charger is employed. The charger includes a power supply connectable to an outside power source, first and second battery power sources connected to the power supply for providing power to a battery pack, and a controller connected to the first and second battery power sources for controlling the first and second battery power sources. The first and second battery power sources are preferably connected in parallel to the battery.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which.

DETAILED DESCRIPTION

Figure 1:
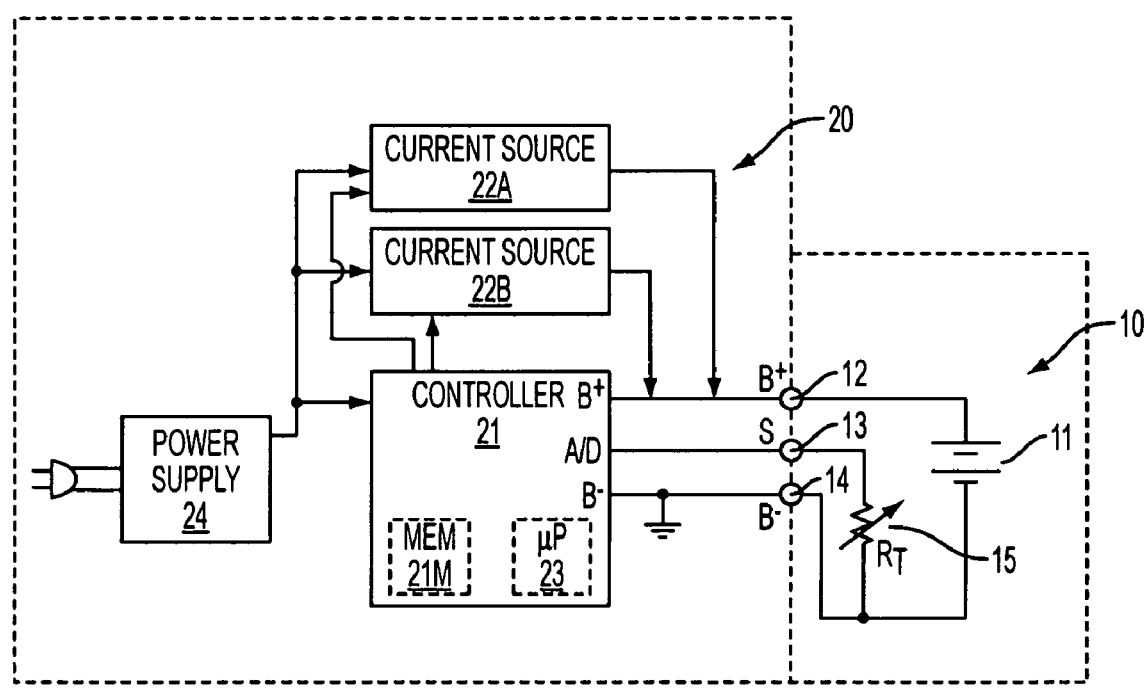
FIG. 1 is a block diagram of a first embodiment of a battery pack and charger according to the invention.

A first embodiment of a battery pack and charger according to the invention is shown in FIG. 1. In such figure, a battery pack 10 is connected to a charger 20. Battery pack 10 may comprise a plurality of battery cells 11 connected in series and/or parallel, which dictate the voltage and storage capacity for battery pack 10.

Battery pack 10 may include three battery contacts: first battery contact 12, second battery contact 13, and third battery contact 14. Battery contact 12 is the B+ (positive) terminal for battery pack 10. Battery contact 14 is the B− or negative/common terminal. Battery contact 13 is the S or sensing terminal. Battery contacts 12 and 14 receive the charging current sent from the charger 20 (preferably from current source 22, as discussed below) for charging the battery pack 10.

As shown in FIG. 1, the battery cells 11 are connected between the battery contacts 12 and 14. In addition, preferably connected between battery contacts 13 and 14 is a temperature sensing device 15, such as a negative temperature co-efficient (NTC) resistor, or thermistor, $R_T$. The temperature sensing device is preferably in closer proximity to the cells 11 for monitoring of the battery temperature. Persons skilled in the art will recognize that other components, such as capacitors, etc., or circuits can be used to provide a signal representative of the battery temperature.

Battery pack 10 may also comprise an identifier as known in the prior art, so that charger 20 can identify the type and capacity of the battery pack, and charge accordingly.

The charger 20 preferably comprises a controller 21, which in turn includes positive terminal (B+) 16 and negative (B−) terminal 17, which are coupled to battery pack 10 via battery contacts 12 and 14, respectively. The positive terminal may also act as an input, preferably an analog/digital input, in order for the controller 21 to detect the battery pack voltage.

In addition, the controller 21 may include another input TC, preferably an analog/digital input, which is coupled to the temperature sensing device 15 via the third battery contact 13 (S). This allows the controller 21 to monitor the battery temperature. Controller 21 may include a microprocessor 23 for controlling the charging and monitoring operations. Controller may also include a memory 21M for storing charging instructions for the microprocessor 23 to carry out and/or storing information concerning the charging process, etc.

Controller 21 may control at least two charging power sources for providing power to the battery pack 10. As shown in FIG. 1, two current sources 22A, 22B provide current to battery pack 10. Current sources 22A, 22B may be integrated within controller 21. Preferably, current sources 22A, 22B are self-oscillating converter circuits.

The charger 20, and its elements within, including controller 21, microprocessor 23, and current sources 22A, 22B, receive the necessary power from a power supply 24, which may be connected to a vehicle battery, a generator, or an AC outlet. Power supply 24 may convert the power received from the vehicle battery, the generator, or the AC outlet to the necessary power requirements of the different elements, as is well known in the art.

Figure 3:
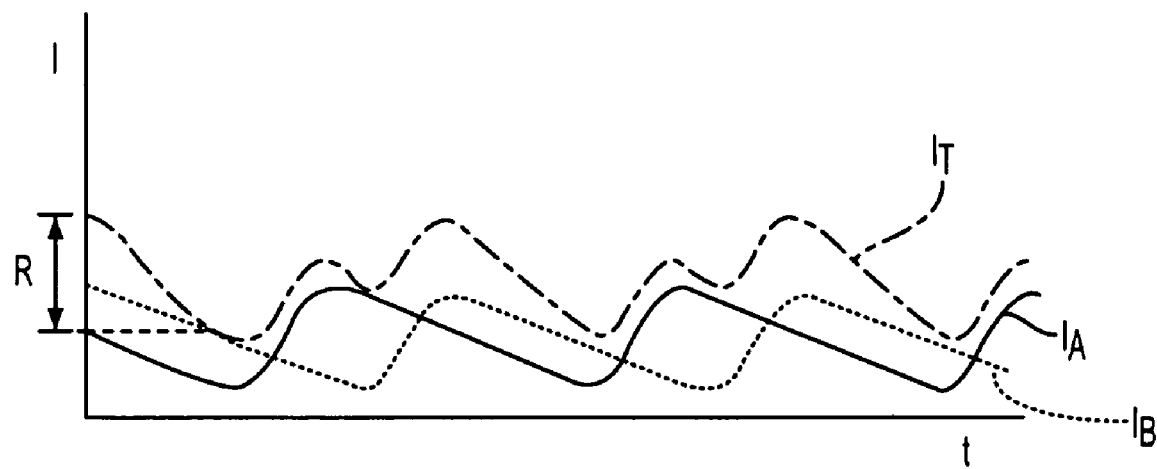
FIG. 3 illustrate output current curves generated by the charger according to the invention.
Figure 4:
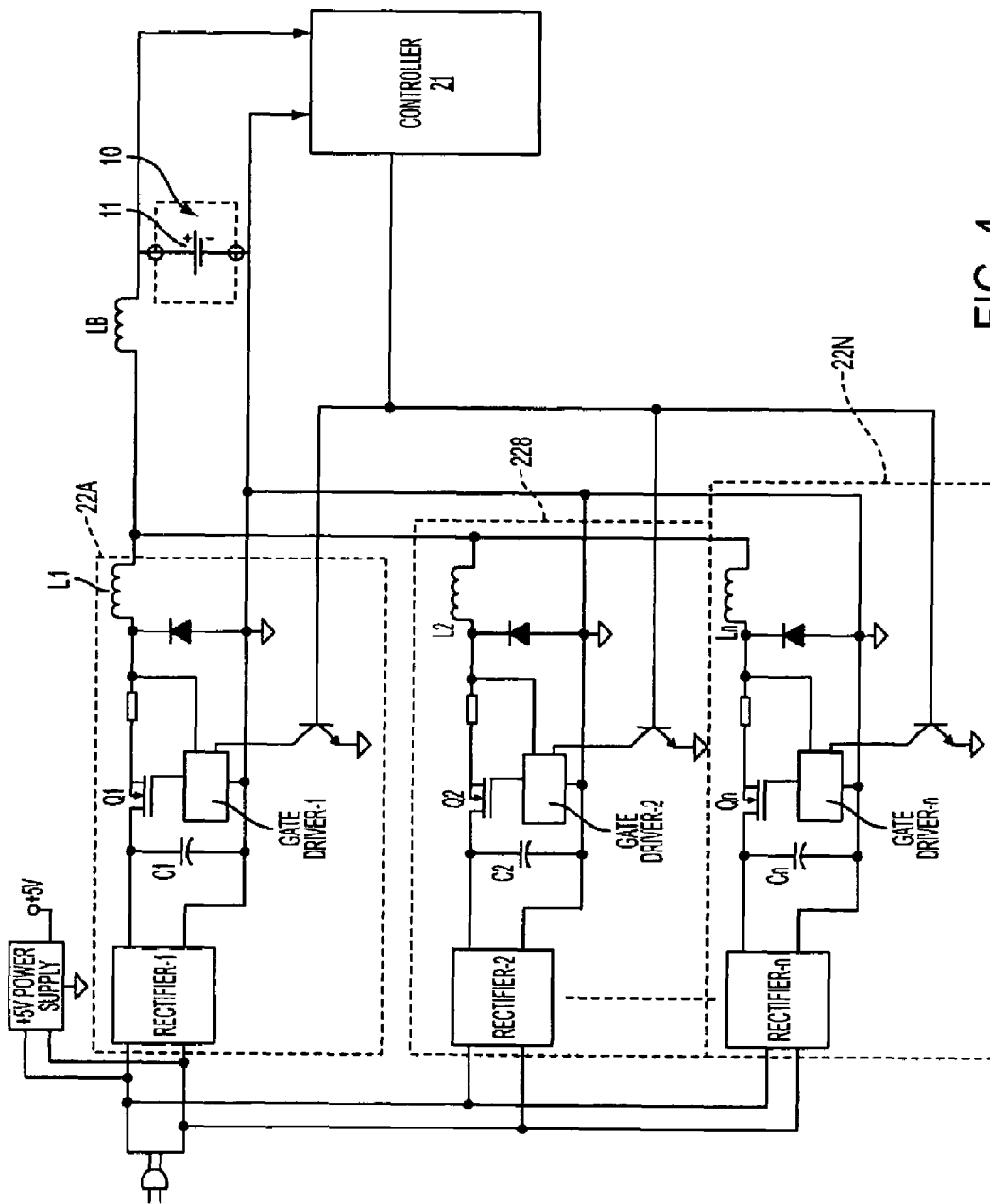
FIG. 4 is a block diagram of a third embodiment of a battery pack and charger according to the invention.

Preferably current sources 22A, 22B are connected in parallel to battery pack 10. FIG. 3 illustrates the output currents $I_A$, $I_B$ of current sources 22A, 22B, respectively. Because of the preferable parallel arrangement, the current $I_T$ sent to battery pack 10 will be an addition of output currents $I_A$, $I_B$. Persons skilled in the art will recognize that such arrangement provides a charger with higher output current capability at a low cost. Such higher output current allows for faster charging of a battery pack.

Persons skilled in the art notice that it desirable to ensure that the output currents $I_A$, $I_B$ are not synchronized. This is because, when the currents are added, the resulting difference between the maximum current and the minimum current, i.e., the peak to peak current "ripple" R, is smaller than if the currents $I_A$, $I_B$ were synchronized. Having a smaller ripple is desirable in order to minimize any damage to battery pack 10 due to the charging process.

Persons skilled in the art will recognize that the present arrangement can be used to provide a fast charging current and/or an equalization current to battery pack 10.

Figure 2:
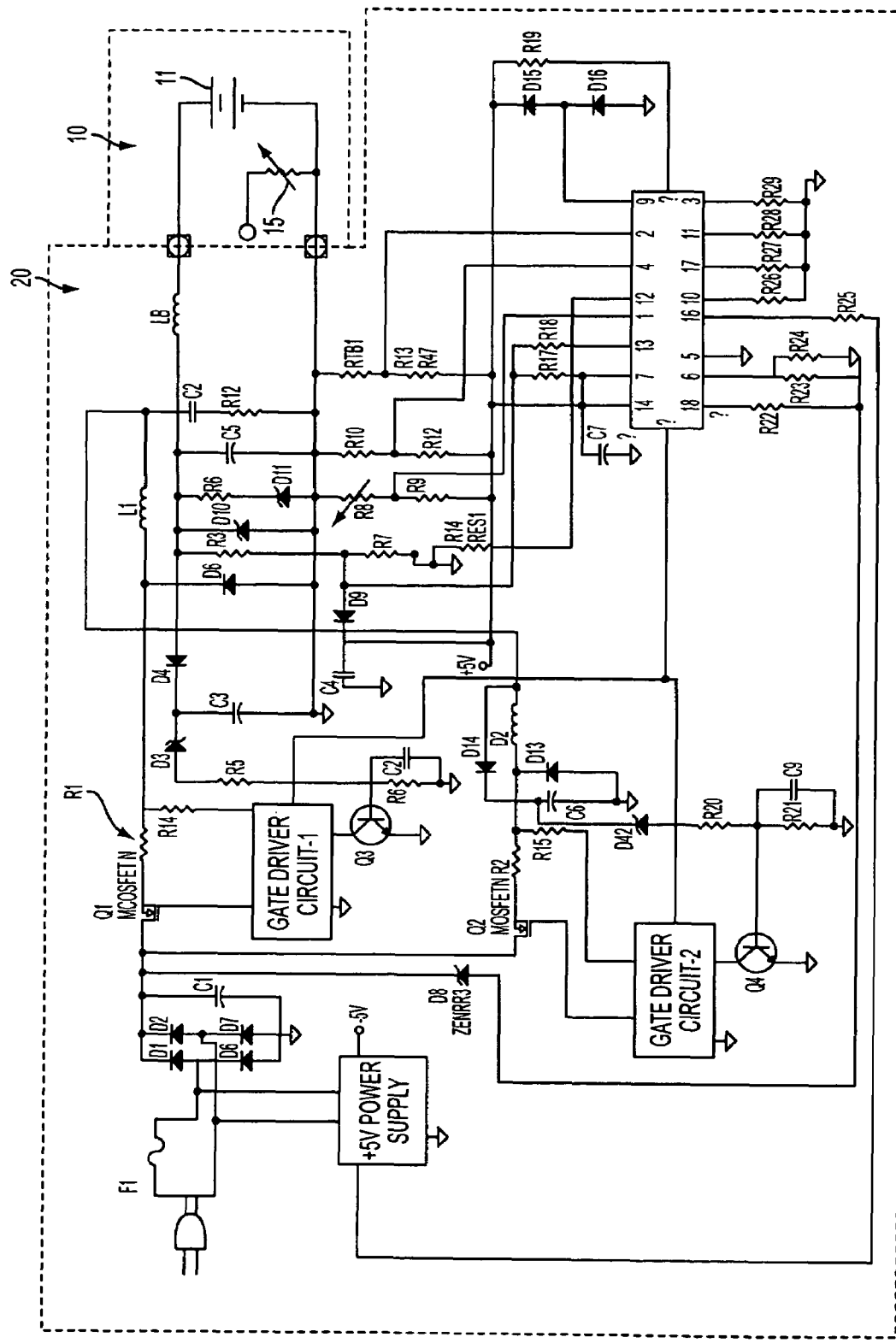
FIG. 2 is a schematic diagram of a first embodiment of a battery pack and charger according to the invention.

FIG. 2 illustrates a second embodiment of the battery charger according to the invention. The teachings of the previous embodiment are wholly incorporated herein by reference. The main difference between the first and the second embodiments is that the second embodiment does not have a connection to the temperature sensing device 15 of battery pack 10. Persons skilled in the art are referred to U.S. Pat. No. 5,783,930, which is fully incorporated herein by reference, for further information on the function and interaction of each component in the schematic diagram.

FIG. 3 illustrates a third embodiment of the battery charger according to the invention, where like numerals refer to like parts. The teachings of the previous embodiments are wholly incorporated herein by reference. The main difference between the first and the third embodiments is that the third embodiment has more than 2 current sources (22A, 22B). Indeed, a designer can provide as many current sources (22A, 22B, . . . 22N) as desired. Persons skilled in the art will recognize that it is desirable to ensure that the current outputs of the different sources are not synchronized in order to minimize the ripple R.

Persons skilled in the art may recognize other alternatives to the means disclosed herein. However, all these additions and/or alterations are considered to be equivalents of the present invention.

What is claimed is:

1. A charger comprising:
    a power supply connectable to an outside power source;
    first and second battery power sources connected to the power supply for providing power to a battery pack, the first and second battery power sources being connected in parallel to the battery and respectively having non-synchronized first and second variable power outputs, the first and second variable power outputs having first and second maximum magnitudes; and
    a controller connected to the first and second battery power sources for controlling the first and second battery power sources.

2. The charger of claim 1, wherein the outside power source is one of the group consisting of a vehicle battery, a generator, and an AC outlet.

3. The charger of claim 1, wherein the controller receives a temperature signal from the battery pack.

4. The charger of claim 1, further comprising a third battery power source controlled by the controller, the third battery power source being connected to the power supply and providing power to the battery pack.

5. The charger of claim 4, wherein the first, second and third battery power sources respectively provide first, second and third variable current outputs.

6. The charger of claim 5, wherein the first, second and third variable current outputs are not synchronized.

7. The charger of claim 1, wherein a sum of the first and second power outputs is sometimes smaller than the first and second maximum magnitudes.

\* \* \* \* \*